US006742333B2

(12) United States Patent
Goto

(10) Patent No.: US 6,742,333 B2
(45) Date of Patent: Jun. 1, 2004

(54) AIR-PRESSURE TYPE EXCITATION APPARATUS

(75) Inventor: Katsuhiro Goto, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/270,646

(22) Filed: Oct. 16, 2002

(65) Prior Publication Data
US 2003/0071186 A1 Apr. 17, 2003

(30) Foreign Application Priority Data
Oct. 17, 2001 (JP) ........................................ 2001-318862

(51) Int. Cl.[7] ............................................. F15B 13/044
(52) U.S. Cl. ..................................... 60/469; 267/140.14
(58) Field of Search .......................... 60/469, 409, 412, 60/411, 368; 267/140.14

(56) References Cited

U.S. PATENT DOCUMENTS

| 4,638,983 | A | * | 1/1987 | Idigkeit et al. | ......... 267/140.14 |
| 5,427,347 | A | * | 6/1995 | Swanson et al. | ....... 267/140.14 |
| 5,718,417 | A | * | 2/1998 | Aoki | ..................... 267/140.14 |
| 5,779,231 | A | * | 7/1998 | Okazaki et al. | ......... 267/140.14 |
| 5,947,456 | A | * | 9/1999 | Aoki | ..................... 267/140.14 |
| 6,315,227 | B1 | * | 11/2001 | Schoeck | .................... 242/159 |
| 6,631,895 | B2 | * | 10/2003 | Nemoto | ................. 267/140.14 |

FOREIGN PATENT DOCUMENTS

| JP | 08-177961 | 7/1996 |
| JP | 09-229131 | 9/1997 |
| JP | 11-223237 | 8/1999 |
| JP | 2000-179611 | 6/2000 |

* cited by examiner

Primary Examiner—Edward K. Look
Assistant Examiner—Igor Kershteyn
(74) Attorney, Agent, or Firm—Oblon, Spivak, McClelland, Maier & Neustadt, P.C.

(57) ABSTRACT

A control section outputs a reference signal which corresponding to a frequency and an amplitude of signals sent from a vibration generation source. The pulse width modulation section generates a drive control signal to, an electromagnetic valve, connection of an air chamber and is alternately switched between the side of an inlet port and the side of the atmosphere. The drive control signal corresponds to an amplitude of the reference signal and is composed of at least the same number of pulses corresponding to a duty ratio-changed frequency as that of each one period of the standard signal. The drive control signal is synchronized with the standard signal. The number of pulses of the drive control signal for each period of the reference signal is changed corresponding to a control frequency of the standard signal so that the number of pulses and the control frequency is not larger than a responding frequency of the electromagnetic valve.

6 Claims, 6 Drawing Sheets

AIR-PRESSURE TYPE EXCITATION APPARATUS

BACKGROUND OF THE INVENTION

1. Field of the Invention

The present invention relates to an air-pressure type excitation apparatus for actively suppressing vibration of a control-subject vehicle etc. by utilizing such excitation force of an actuator equipped with a closed air chamber as to be based on a pressure variation caused inside the air chamber by alternately switching a state of communication to the air chamber from two air-pressure sources having different air pressures owing to electromagnetic switching means such as an electromagnetic valve.

2. Description of the Related Art

Conventionally, this sort of air-pressure type excitation apparatus controls the switching operations of the switching valve by utilizing a drive control signal formed on the basis of a reference signal correlated with an oscillation frequency of a standard signal and an oscillation amplitude of a state signal sent from a vibration generation source. As this drive control signal, a pulse signal is used which has the same frequency as the oscillation frequency and also which is converted the oscillation amplitude into a duty ratio of the pulse corresponding to the oscillation frequency of the standard signal and the oscillation amplitude of the state signal.

To reduce the actuator's excitation force, that is the vibration suppressing force by the excitation apparatus, using the drive control signal, adjustment is made to reduce the duty ratio of the pulse of the drive control signal. The excitation force, on the other hand, hits a maximum when the duty ratio of the pulse of the drive control signal is about 50–60%, so that as the pulse duty ratio goes away from the value of 50–60%, a harmonic component increases with respect to a control frequency of the drive control signal. As the harmonic component thus increases, the vibration of other than the control frequency and the corresponding noise increase on what is subject to vibration control such as a vehicle, thus deteriorating the vibration suppressing effects.

To guard against this, there is a method available for providing and utilizing a muffler such as a branch hose etc. somewhere along an air flow path between the air chamber and the switching valve to thereby attenuate an air pressure fluctuation in a frequency band outside the frequency of the vibration to be suppressed. By this control method, however, the control costs are high, so that it is difficult to provide an inexpensive excitation apparatus. There is another method available for providing an excitation apparatus with filter characteristics relating to the excitation force thereof to thereby limit the frequency of its effective excitation force down to a predetermined value or less, thus removing a useless harmonic component. This method, however, narrows the band of the operating frequency of the excitation apparatus, so that its applications are limited, which is a problem.

SUMMARY OF THE INVENTION

In view of the above, it is an object of the present invention to provide an air-pressure type excitation apparatus which can remove a harmonic component inexpensively with a simple configuration and also which can give proper excitation force.

To achieve this object, a first aspect of the present invention comprises an actuator equipped with a closed air chamber, electromagnetic switching means which is provided somewhere along an air flow path connected to the air chamber and also which alternately switches a state of communication to the air chamber from two air pressure sources having different air pressures, and drive control signal generation means which generates a drive control signal based on a reference signal correlated with an oscillation frequency of a standard signal and an oscillation amplitude of a state signal sent from a vibration generation source, in such a configuration that the drive control signal is used to control switching operations of the electromagnetic switching means to thereby give birth to a pressure variation inside the air chamber in order to actively suppress control-subject vibration utilizing such excitation force of the actuator as to be based on the pressure variation, in which the drive control signal is pulse-width modulated corresponding to an amplitude of the reference signal, includes at least one pulse for each period of the reference signal, and is synchronized with the standard signal.

In the first aspect, the drive control signal is pulse-width modulated corresponding to the amplitude of the reference signal and also includes at least one pulse for each period of the standard signal. The drive control signal, therefore, can be composed of the pulses having a duty ratio of about 50–60%. As a result, it is possible to suppress a harmonic component with respect to the control frequency, which gives rise to a problem as the pulse duty ratio goes away from the value of 50–60%. Furthermore, since the drive control signal is synchronized with the standard signal, it is possible to prevent fluctuations of a low frequency, which occur when the waveform of the drive control signal changes if it is not synchronized instead. It is thus possible to suppress the vibration of other than the control frequency and the corresponding noise on a vehicle, thus easily and properly obtaining the vibration suppressing effects of the air-pressure type excitation apparatus.

A second aspect of the present invention comprises an actuator equipped with a closed air chamber, electromagnetic switching means which is provided somewhere along an air flow path connected to the air chamber and also which alternately switches a state of communication to the air chamber from two air pressure sources having different air pressures, drive control signal data storage means which stores data of a plurality of drive control signals generated beforehand by drive control signal generation means based on a reference signal correlated with an oscillation frequency of the standard signals and an oscillation amplitude of the state signals with regard to a plurality of different standard signals and state signals are sent from a vibration generation source, and drive control signal output means which reads out the drive control signal data from the drive control signal data storage means corresponding to the oscillation frequency of the standard signal and the oscillation amplitude of the state signal when the signals are received, to then output the drive control signal, in such a configuration that the drive control signal is used to control switching operations of the electromagnetic switching means to thereby give birth to a pressure variation inside the air chamber in order to actively suppress control-subject vibration utilizing such excitation force of the actuator as to be based on the pressure variation, in which the drive control signal is pulse-width modulated corresponding to an amplitude of the reference signal, includes at least one pulse for each period of the reference signal, and is synchronized with the standard signal.

In the second aspect, besides the actions of the above-mentioned first aspect, when having received the standard signal and the state signal, the drive control signal output means reads out a drive control signal corresponding to the oscillation frequency of this standard signal and the oscillation amplitude of this state signal from the drive control signal data storage means and then outputs this drive control signal. The drive control signal, therefore, can be generated easily and inexpensively. Moreover, in the drive control signal, a harmonic component can be easily suppressed with respect to a control frequency. Furthermore, it is possible to easily prevent fluctuations in the low frequency, which occur when the waveform of the drive control signal changes. This results in a simple configuration of the control section of the air-pressure type excitation apparatus, thus reducing the costs of the control-related parts greatly.

Besides, according to the present invention, the reference signal may be a sine wave signal given on the basis of an oscillation frequency of the standard signal and an oscillation amplitude of the state signal. It is, therefore, possible to easily generate the drive control signal by performing pulse width modulation on the reference signal, which is thus given as a sine wave signal.

Furthermore, according to the present invention, the number of pulses of the drive control signal for each period of the reference signal can be changed corresponding to the control frequency of the standard signal so that the product of the number of the pulses and the control frequency not larger than a responding frequency of the electromagnetic switching means. By thus changing the number of pulses of the drive control signal for each period of the reference signal corresponding to the control frequency of the standard signal, the drive control signal can be composed of the proper pulses that match a range of the control frequency. Furthermore, by thus limiting the product of the number of the pulses and the control frequency down to the responding frequency of the electromagnetic switching means or less, the electromagnetic switching means can be driven properly by the drive control signal.

DESCRIPTION OF THE PREFERRED EMBODIMENTS

The following will describe embodiments of the present invention with reference to drawings.

First Embodiment

Figure 1:
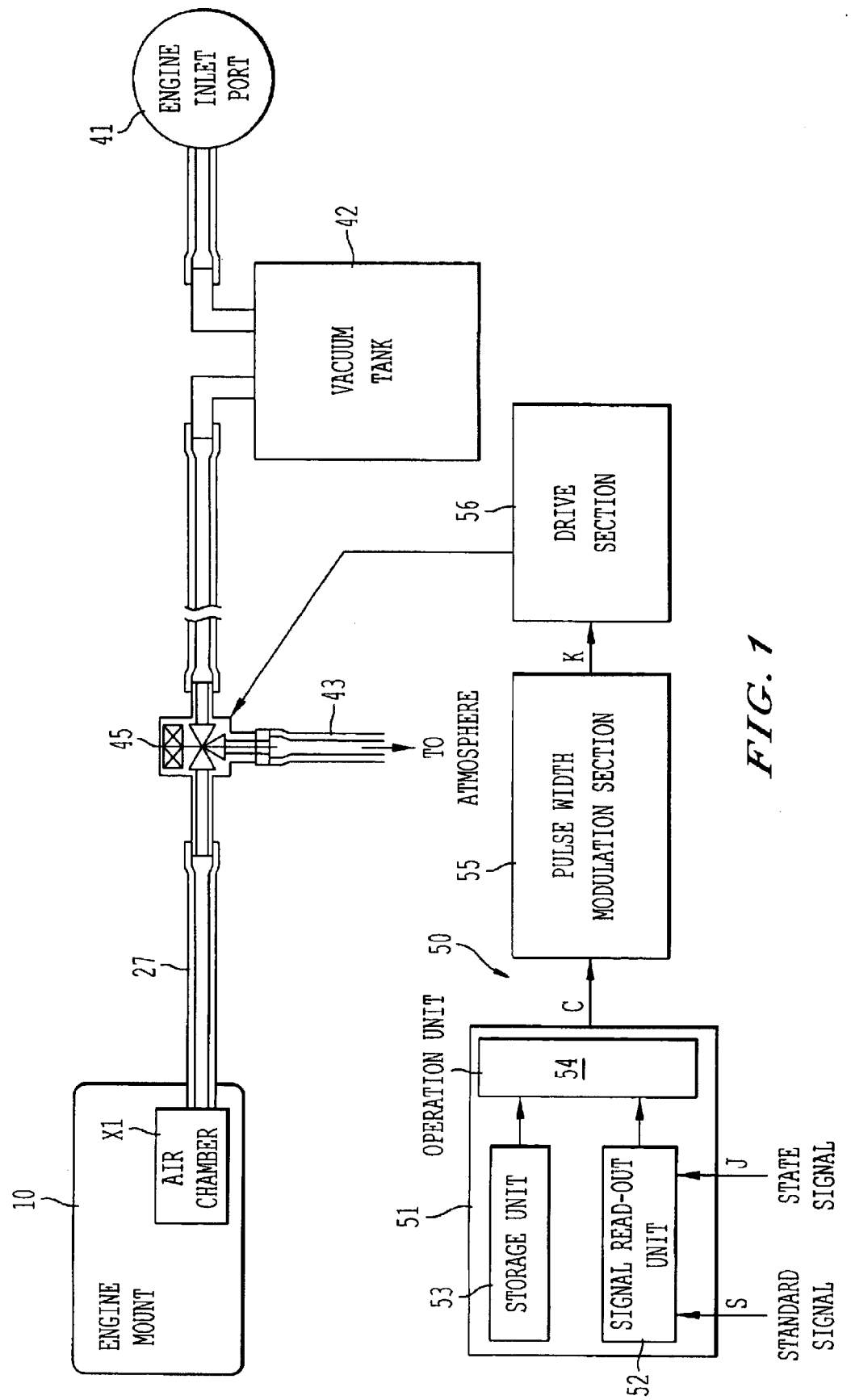
FIG. 1 is a schematic diagram for outlining an overall configuration of an air-pressure type excitation apparatus related to a first embodiment of the present invention applied in a vehicle.
Figure 2:
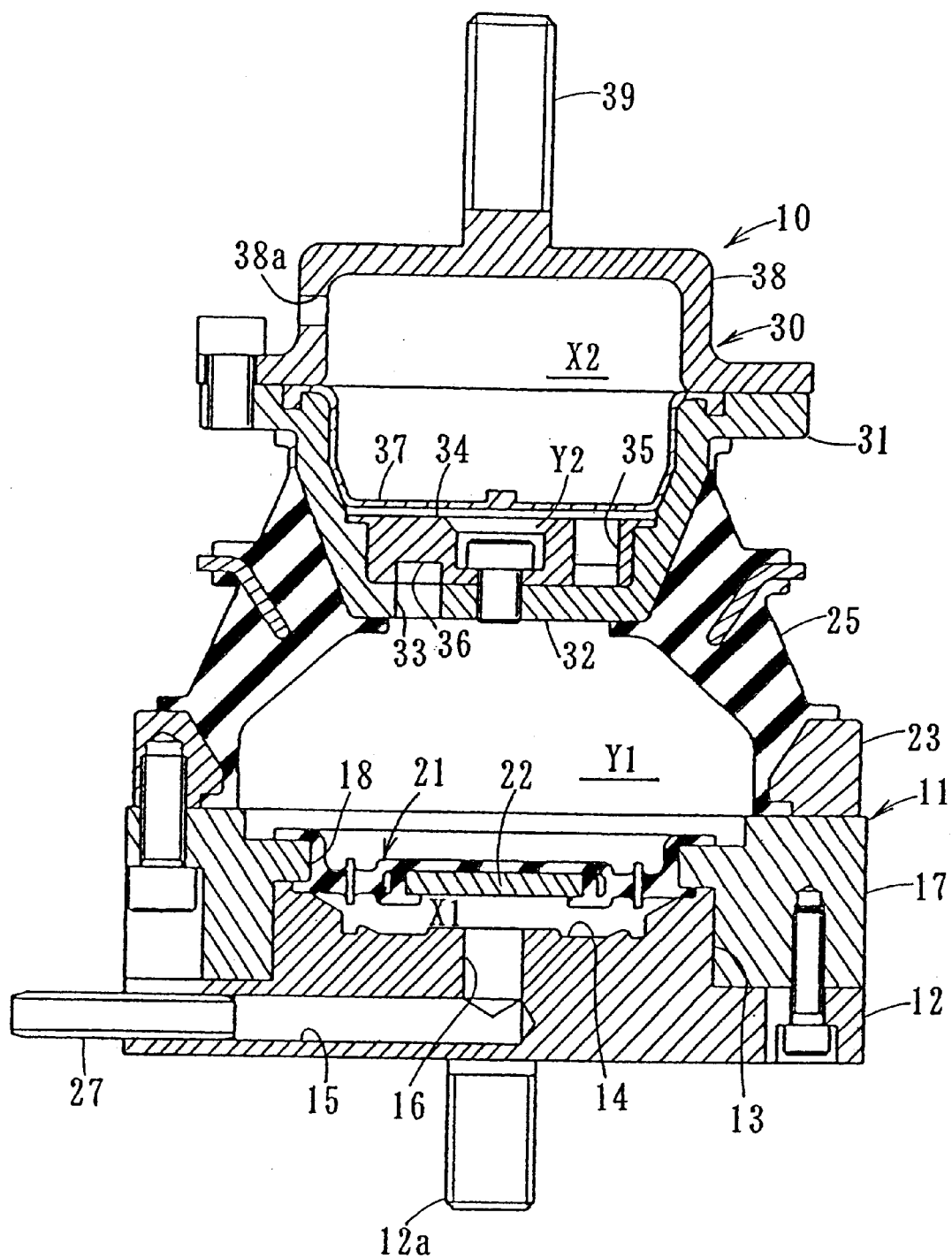
FIG. 2 is a cross-sectional view for schematically showing an engine mount for the air-pressure type excitation apparatus related to the first embodiment of the present invention.

FIG. 1 is a schematic diagram outlining an overall configuration of an air-pressure type excitation apparatus related to a first embodiment of the present invention applied to an engine whose vibration is to be controlled in an automobile, and FIG. 2, a cross-sectional view showing an engine mount, which is an important section of the air-pressure type excitation apparatus. This air-pressure type excitation apparatus comprises an engine mount 10, an electromagnetic valve 45 serving as electromagnetic switching means provided somewhere along a vent tube 27 extending from an air chamber X1 of the engine mount 10, for switching the air chamber X1 between the side of an inlet port 41, which is the negative pressure source, and that of the atmosphere, and an electric control device 50 for controlling the opening/closing operations of the electromagnetic valve 45.

As shown in FIG. 2, the engine mount 10 is composed of first and second supporting metal fittings 11 and 30 coaxially arranged with a predetermined spacing therebetween and a roughly cylindrical elastic rubber body 25 which couples them with each other. The first supporting metal fitting 11 has a disc-shaped base 12 having a disc-shaped projection 13 on an upper face thereof concentrically. In almost thoroughly the upper face of the projection 13 is there formed a bowl-shaped recess 14 including central symmetrical irregularities. One vent hole 15 is formed from the side face of the base 12 toward its center, into which is externally fitted and fixed the vent tube 27, which provides an air flow path. The projection 13 has a central hole 16 formed therein centrally which extends from the upper face through to the vent hole 15. On the back side face of the base 12 is centrally protruded a rigid shaft 12a vertically.

A circular ring-shaped annular member 17 is fitted to the base 12 and the projection 13 tightly. Near the upper end of the annular member 17, there is provided an annular inner flange 18 slightly protruding inward, butting against the upper end of the projection 13. The inner flange 18 is mounted with a disc-shaped vibration transmission plate 21 to block an inner opening thereof. The vibration transmission plate 21 is a rubber-made thick plate and has a metallic circular plate 22 buried centrally therein with its bottom side as exposed. A flat gap between the vibration transmission plate 21 and the bowl-shaped recess 14 below it provides the air chamber X1.

The annular member 17 is mounted thereon with a metallic upper annular member 23 having almost the same outer diameter as that of the annular member 17. To the upper annular member 23, the annular member 17 is fixed with a bolt. Above the upper annular member 23 is coaxially arranged the second supporting metal fitting 30 via the conic hollow elastic rubber body 25. The second supporting metal fitting 30 is formed by superposing a lower side metal fitting 31 and an upper side metal fitting 38, which are a cylindrical bottomed vessel, on each other with their respective openings as opposed to each other.

The lower side metal fitting 31 is roughly conical in shape, having an outer flange at its upper end and an orifice hole 33 formed therein at part of a bottom face 32 thereof. At the lower side portion in the lower side metal fitting 31, a circular plate-shaped orifice member 34 is fitted tightly. The orifice member 34 has therein a hole at its center and a vertical through hole 35 at one peripheral part thereof. Moreover, on its bottom side, the orifice member 34 has therein a horizontal hole 36 extending from the vertical hole 35 in a circular shape, which holes 35 and 36 are combined to form an orifice. The orifice member 34 is fixed in the lower side metal fitting 31 with a small screw in such a condition that the tip of the horizontal hole 36 communicates with the orifice hole 33 formed in the lower side metal fitting 31. At the upper side of the lower side metal fitting 31, a diaphragm member 37 is fitted tightly which is a bottomed cylinder in shape made of a thin metal plate and which has an outer flange at its opening. There is a slight gap Y2 provided between the bottom face of the diaphragm member 37 and the upper face of the orifice member 34.

An upper side metal fitting 38 is a cylinder in shape having an outer flange at its periphery on the side of its opening and has a rigid shaft 39 at the center on its outer bottom face and an air flow hole 38a formed in its circumferential wall. The upper side metal fitting 38 and the lower side metal fitting 31 are integrated with each other by superposing the outer flange of the upper side metal fitting 38 onto the outer flange of the lower side metal fitting and screwing them to each other, thus forming the second supporting metal fitting 30. The inside of the second supporting metal fitting 30 provides an air chamber X2 as enclosed between the upper side metal fitting 38 and the diaphragm member 37.

In this configuration, between the outer peripheral wall of the lower side metal fitting 31 and the inner peripheral wall of the upper annular member 23 is arranged the above-mentioned elastic rubber body 25 in a roughly conic shape to elastically couple these two members 23 and 31 with each other and also provide a liquid containing space Y1 as enclosed by the bottom face of the lower side metal fitting 31, the annular member 17, and the vibration transmission plate 21. The liquid containing space Y1 is filled with a liquid, which also fills the orifice of the orifice member 34 and the above-mentioned gap Y2.

The engine mount 10 having such a configuration as described above has the rigid shaft 12a fixed to the body of the automobile (not shown) and the rigid shaft 39 attached to an engine (not shown), thus supporting the engine in a vibration proofing manner.

As shown in FIG. 1, the engine mount 10 is connected to the engine's inlet port 41, which is the negative pressure source, through the vent tube 27 extended from the vent hole 15. A negative pressure tank 42 is interposed between the vent tube 27 and the inlet port 41 in order to stabilize its negative pressure state. Furthermore, somewhere along the vent tube 27, the three-port type electromagnetic valve 45 is connected through two of the three ports to the side of the vent hole 15. The electromagnetic valve 45 is connected through the other port to a pipe 43, which communicates with the side of the atmosphere. When the electromagnetic valve 45 is de-energized, the air chamber X1 communicates with the atmosphere, and when it is switched and energized, the air chamber X1 communicates with the inlet port 41. Here, the switching in connection of the electromagnetic valve 45 between the side of the inlet port 41 and the side of the atmosphere may be opposite.

The following will describe the electric control device 50, which controls how the electromagnetic valve 45 is energized/de-energized. As shown in FIG. 1, the electric control device 50 is provided with a control section 51 composed of a microcomputer etc., a pulse-width modulation section 55 which is combined with the control section 51 to constitute the drive control signal generation means, and a drive section 56. The control section 51 includes a signal read-out unit 52, a storage unit 53, and an operation unit 54. The signal read-out unit 52 receives a standard signal S having such a frequency of rotation pulses etc. sent from a revolution speed sensor provided on the engine as to correspond to an oscillation frequency of the vibration generation source and a state signal J (indicating shift position, water temperature, automobile speed, accelerator opening, etc.), to thereby read out the frequency and various running states (which are correlated with amplitude and phase). The storage unit 53 stores a reference signal C, which is a sine wave signal correlated with an oscillation frequency of the standard signal S and an oscillation amplitude of the state signal J. The operation unit 54 obtains by operations a frequency value and an amplitude value based on an input sent from the signal read-out unit 52 and picks up data of the reference signal C corresponding to these frequency and amplitude values thus obtained. This reference signal C is in phase with the standard signal S. Furthermore, the operation unit 54 selects a duty ratio-changed frequency corresponding to a control frequency of the standard signal S. The operation unit 54 outputs the data of the reference signal C and the duty ratio-changed frequency to the pulse width modulation section 55.

The above-mentioned duty ratio-changed frequency refers to a frequency for changing the number of pulses for each period of the drive control signal corresponding to a control frequency and actually is given as a product of the control frequency and the number of pulses. Furthermore, the duty ratio-changed frequency is determined in a range not higher than 100 Hz, which is a responding frequency of the electromagnetic valve 45. For example, it is as follows:
(1) If a control-subject frequency is 25 Hz, the duty ratio-changed frequency becomes 100 Hz:
 Then, the frequency ratio is 1:4.
(2) If a control-subject frequency is 30 Hz, the duty ratio-changed frequency becomes 90 Hz:
 Then, the frequency ratio is 1:3.
(3) If a control-subject frequency is 50 Hz, the duty ratio-changed frequency becomes 100 Hz:
 Then, the frequency ratio is 1:2.
(4) If a control-subject frequency is 60 Hz, the duty ratio-changed frequency becomes 60 Hz:
 Then, the frequency ratio is 1:1.

Figure 3:
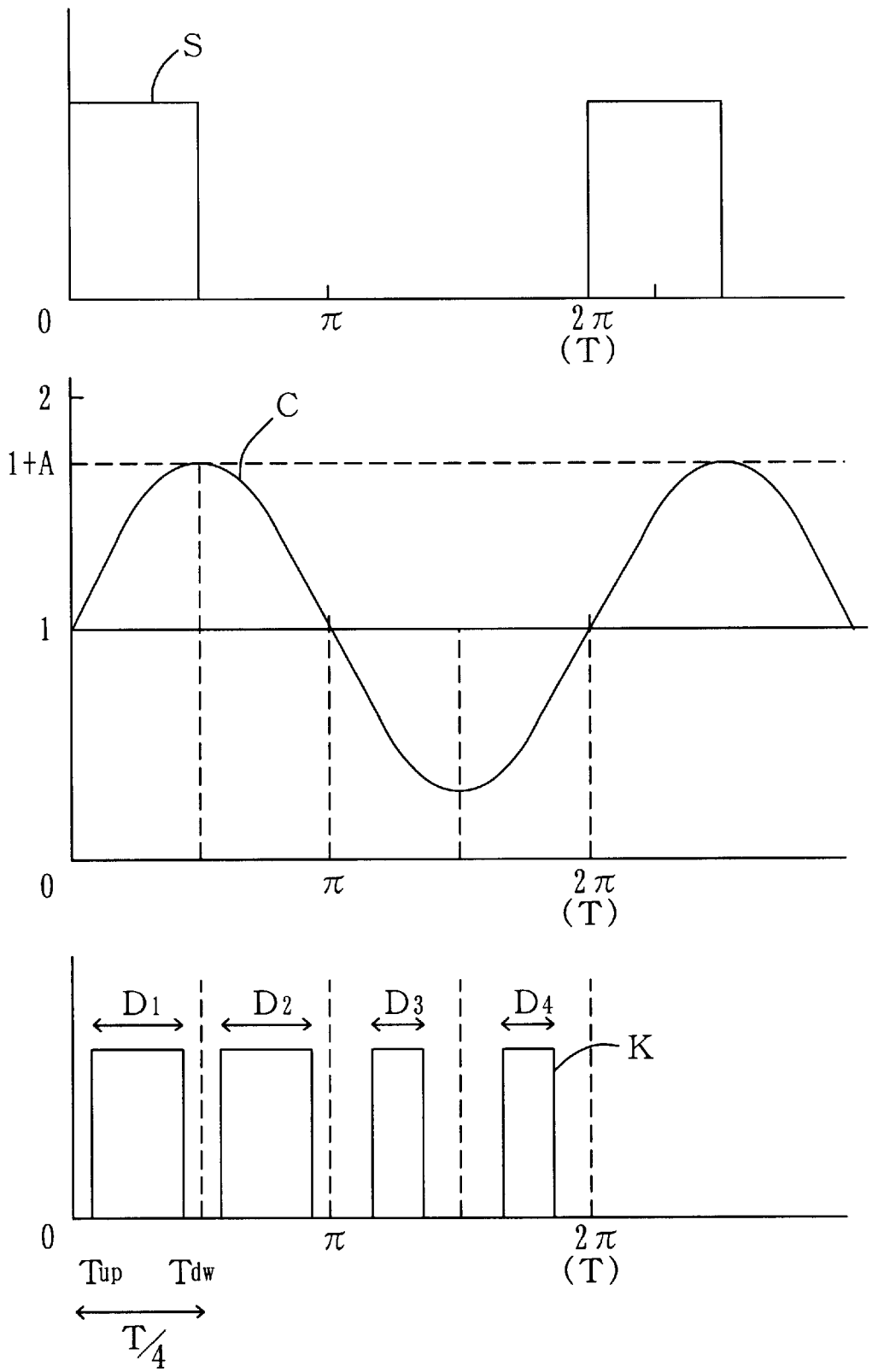
FIG. 3 is an illustration for explaining how to generate a drive control signal of the air-pressure type excitation apparatus related to the first embodiment of the present invention.

The pulse width modulation section 55 uses a predetermined operational equation which corresponds to a duty ratio-changed frequency based on the reference signal C sent from the control section 51, thus forming a pulse width-modulated drive control signal K. The drive control signal K is in phase with the reference signal C and hence with the standard signal S as well. If the control frequency is 25 Hz, for example, the duty ratio-changed frequency is 100 Hz, so that as shown in FIG. 3, based on an area of a sine wave signal, that is, the reference signal C, the following operational equation 1 is used to calculate modulated pulse widths D1–D4 and another following operational equation 2 is used to obtain a rise time Tup and a fall time Tdw.

$$D1=D2=(\pi/2+A \cdot Dep)/\pi xx \ T/4 \ D3=D4=(\pi/2-A \cdot Dep)/\pi xx \ T/4 \quad \text{(Eq. 1)}$$

$$Tup=(T/4)k-T/8-D \cdot k/2 \ Tdw=(T/4)k+T/8+D \cdot k/2 \quad \text{(Eq. 2)}$$

where A is an amplitude of the control signal, Dep is a coefficient ($1<Dep \leq \pi/2$), and k=1–4, which indicates an ordinal number of the pulse.

The pulse width modulation section 55 is connected to the drive section 56 which drives a solenoid of the electromagnetic valve 45. The drive section 56 performs switching operations based on the drive control signal K sent from the pulse width modulation section 55, specifically by outputting a drive signal, which is a switching output, to drive the solenoid of the electromagnetic valve 45.

The following will describe the operations of the present embodiment having such configuration as described above.

The control section 51 starts its operation when an ignition switch is turned ON; for example, when the standard signal S with a frequency of 25 Hz and the state signal J are input, they are read in the signal read-out unit 52. Then, the operation unit 54 obtains by operations the frequency of this standard signal S and an amplitude of this state signal J, and reads out from the storage unit 53 the data of such a reference signal C as to correspond to the frequency, amplitude and phase, and determines a duty ratio-changed frequency for this control frequency to then output the data of the reference signal C and the duty ratio-changed frequency to the pulse width modulation section 55. Then, the pulse width modulation section 55 uses the above-mentioned equations 1 and 2 to generate a drive control signal K by pulse width modulation and output it to the drive section 56. When having received the drive control signal K, the drive section 56 performs switching operations; specifically, it turns ON/OFF the electromagnetic valve 45 according to the drive signal, which is a switching output corresponding to the drive control signal K. Each time the electromagnetic valve 45 is turned ON/OFF, the connection to the air chamber X1 is alternately switched between the side of the inlet port 41 and the side of the atmosphere.

In the engine mount 10, if the electromagnetic valve 45 is turned ON, air is sucked by the inlet port 41, which is the negative pressure source, through the vent tube 27, the vent hole 15, and the central hole 16, to give rise to a negative pressure state in the air chamber X1, thus pulling down the vibration transmission plate 21. Correspondingly, a liquid in the liquid containing space Y1 is moved downward to suck a liquid in the orifice member 34 and the gap Y2, thereby deforming the diaphragm member 37 downward. If the electromagnetic valve 45 is turned OFF, on the other hand, air is supplied through the vent tube 27, the vent hole 15, and the central hole 16, to provide an atmospheric pressure in the chamber X1, thus returning the vibration transmission plate 21 upward. Correspondingly, a liquid in the liquid containing space Y1 is moved upward to fill the orifice member 34 and the gap Y2 with a liquid, thereby restoring the diaphragm member 37 to its normal state. As the electromagnetic valve 45 is turned ON/OFF repeatedly, the diaphragm member 37 thus vibrates to excite the engine mount 10, so that vibration of the engine mount 10 offsets vibration propagating from the engine to a body of the automobile, thus enabling actively suppressing the vibration of the body of the automobile.

Note here that the above-mentioned drive control signal K has been pulse-width modulated corresponding to the amplitude of the reference signal C and composed of at least the same number of pulses corresponding to a duty ratio-changed frequency as that of each one period of the standard signal. The drive control signal K, therefore, can be composed of pulses having a duty ratio of about 50–60%. As a result, it is possible to suppress a harmonic component with respect to the control-subject frequency, which gives rise to a problem as the pulse duty ratio goes away from the value of 50–60%.

Figure 4:
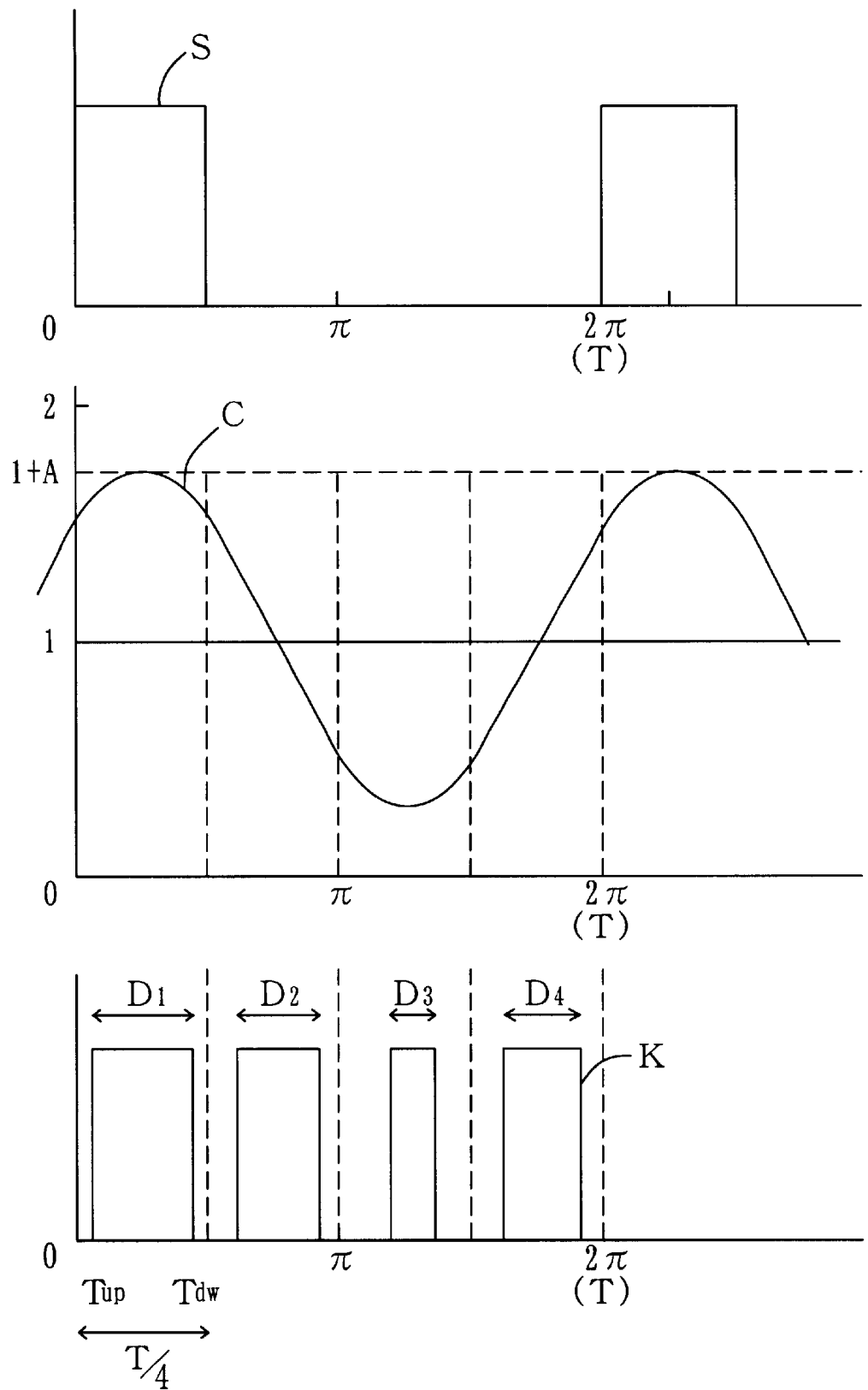
FIG. 4 is an illustration for explaining how to generate the drive control signal in a case where there is a difference in phase between a standard signal S and a drive control signal K.

Furthermore, since the drive control signal K is synchronized with the standard signal S, it is possible to prevent fluctuations of a low frequency, which occur when the waveform of the drive control signal K changes because of the fluctuations of the control frequency. For example, if the drive control signal K is not synchronized with the standard signal S, the drive control signal K has a differently pulse-width modulated waveform as shown in FIG. 4 corresponding to a degree of this asynchronism, so that low-frequency fluctuations occur between the waveforms, thus giving rise to noise vibration.

Furthermore, by changing the number of pulses of the drive control signal K for each period of the reference signal C corresponding to the control frequency of the standard signal S, the drive control signal K can be composed of the proper pulses that match the control frequency. Therefore, proper fluctuations in pressure can be generated in the air chamber X1, as a result of which, proper excitation force can be generated on the engine mount 10, thus properly suppressing the vibration of the automobile body. Furthermore, corresponding to a frequency of the standard signal S, a proper reference signal C is created and mapped to store. The mapped data is stored in the storage unit 53 beforehand so that a proper reference signal can be read out from the storage unit 53 in configuration, thus simplifying the control-related parts and reducing the control-related costs.

Second Embodiment

The following will describe a second embodiment of the present invention.

Figure 5:
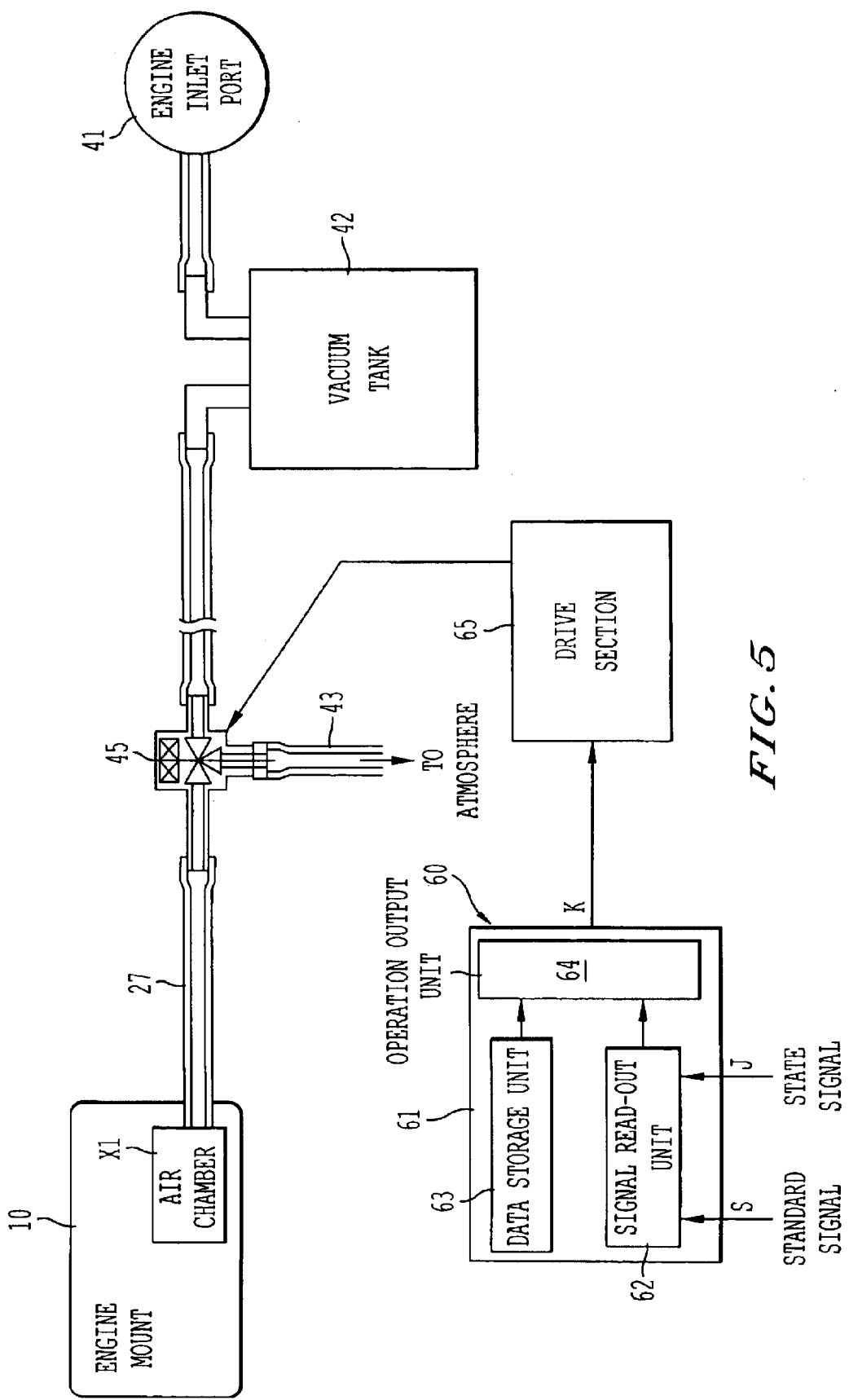
FIG. 5 is a schematic diagram for outlining an overall configuration of the air-pressure type excitation apparatus related to a second embodiment.

An air-pressure type excitation apparatus according to the second embodiment has such a configuration shown in FIG. 5 that the above-mentioned electric control device 50 is replaced by an electric control device 60 for controlling how the electromagnetic valve 45 is energized/de-energized. The electric control device 60 is provided with a control section 61 composed of a microcomputer etc. and a drive section 65. The control section 61 includes a signal read-out unit 62, a data storage unit 63 to constitute the drive control signal data storage means in which drive control signal data is stored, and an operation output unit 64 which is combined with the signal read-out unit 62 to constitute the drive control signal output means. The signal read-out unit 62 operates the same way as the above-mentioned signal read-out unit 52. The data storage unit 63 stores the data of a plurality of drive control signals for controlling the electromagnetic valve 45 in driving which corresponds to an oscillation frequency and an oscillation amplitude respectively of a plurality of different standard signals S and state signals J sent from the oscillation generation source.

Figure 6:
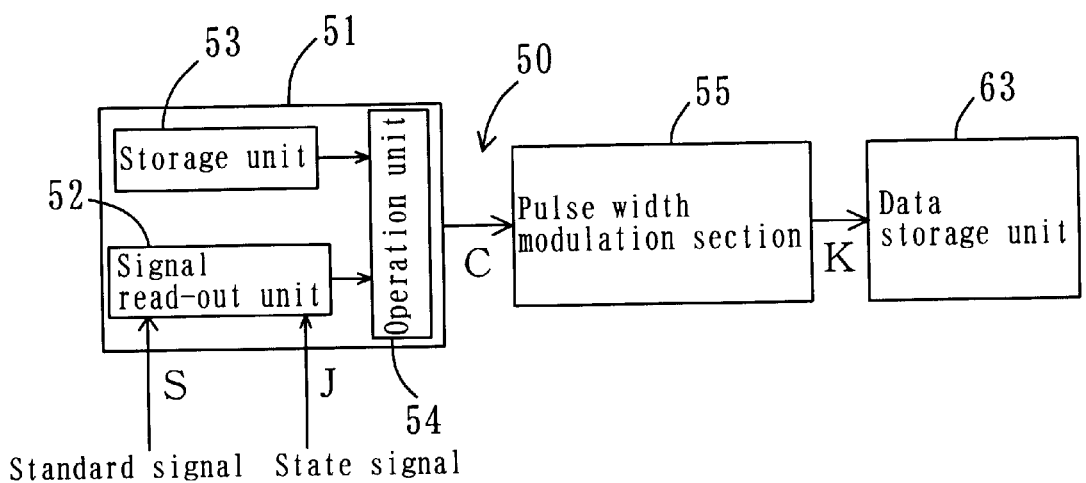
FIG. 6 is a block diagram for schematically showing a control device for obtaining drive control signal data.

To create data of the drive control signal K, as shown in FIG. 6, similar to the first embodiment, the control section 51 and the pulse width modulation section 55 are used to obtain the drive control signal K corresponding to the plurality of input standard signals and state signals, so that the drive control signal data thus obtained by operations is stored in the data storage unit 63 as a data table. The other components of the air-pressure type excitation apparatus of the present embodiment are the same as those of the above-mentioned first embodiment.

The operations of the above-mentioned electric control device 60 are described as follows. The standard signal S and the state signal J are input from the vibration generation source into the signal read-out unit 62, so that based on signal data sent from the signal read-out unit 62 a frequency of the standard signal S and an amplitude of the state signal J at the operation output unit 64 are then obtained by operations. The operation output unit 64 then reads out a drive control signal data from the data storage unit 63 corresponding to the frequency and amplitude obtained by operations and outputs it as the drive control signal K to the drive section 65.

Thus, the second embodiment gives almost the same effects as those by the above-mentioned first embodiment. Furthermore, in the second embodiment, drive control signal data needs only to be obtained and stored in the storage unit 63 beforehand so that data corresponding to the input standard signal and state signal may be read out from the storage unit 63 and output as the drive control signal, thus simplifying the configuration of the control device. As a result, the control device of the present embodiment is more inexpensive in costs than that of the first embodiment.

Although the above-mentioned embodiments have employed an engine mount provided with a liquid chamber as the excitation apparatus, it may be the engine mount with no liquid chamber or even such a vibration isolator such as a dynamic damper provided with a mass member other than an engine mount. Also, although the above-mentioned embodiments have employed a sine wave signal as the reference signal, it may be any other than the sine wave signal. The above-mentioned embodiments are just an example and so can be modified variously within the gist of the present invention.

What is claimed is:

1. An air-pressure type excitation apparatus comprising an actuator equipped with a closed air chamber, electromagnetic switching means which is provided somewhere along an air flow path connected to said air chamber and also which alternately switches a state of communication to said air chamber from two air pressure sources having different air pressures, and drive control signal generation means which generates a drive control signal based on a reference signal correlated with an oscillation frequency of a standard signal and an oscillation amplitude of a state signal sent from a vibration generation source, in such a configuration that said drive control signal is used to control switching operations of said electromagnetic switching means to thereby give birth to a pressure variation inside said air chamber in order to actively suppress control-subject vibration utilizing such excitation force of said actuator based on said pressure variation, wherein said drive control signal is pulse-width modulated corresponding to an amplitude of said reference signal, includes at least one pulse for each period of said reference signal, and is synchronized with said standard signal.

2. The air-pressure type excitation apparatus according to claim 1, wherein said reference signal is a sine wave signal based on an oscillation frequency of said standard signal and an oscillation amplitude of said state signal.

3. The air-pressure type excitation apparatus according to claim 1 or 2, wherein the number of pulses of said drive control signal for each period of said reference signal can be changed corresponding to a control frequency of said standard signal so that a product of said number of pulses and said control frequency is not larger than a responding frequency of said electromagnetic switching means.

4. An air-pressure type excitation apparatus comprising an actuator equipped with a closed air chamber, electromagnetic switching means which is provided somewhere along an air flow path connected to said air chamber and also which alternately switches a state of communication to said air chamber from two air pressure sources having different air pressures, drive control signal data storage means which stores data of a plurality of drive control signals generated beforehand by drive control signal generation means based on a reference signal correlated with an oscillation frequency of standard signals and an oscillation amplitude of state signals with regard to a plurality of different standard signals and state signals sent from a vibration generation source, and drive control signal output means which reads out drive control signal data from said drive control signal data storage means corresponding to the oscillation frequency of said standard signals and the oscillation amplitude of said state signals when said signals are input, to then output the drive control signal, in such a configuration that said drive control signal is used to control switching operations of said electromagnetic switching means to thereby give birth to a pressure variation inside said air chamber in order to actively suppress control-subject vibration utilizing such excitation force of said actuator as to be based on said pressure variation, wherein said drive control signal is pulse-width modulated corresponding to an amplitude of said reference signal, includes at least one pulse for each period of said reference signal, and is synchronized with said standard signal.

5. The air-pressure type excitation apparatus according to claim 4, wherein said reference signal is a sine wave signal based on an oscillation frequency of said standard signal and an oscillation amplitude of said state signal.

6. The air-pressure type excitation apparatus according to claim 4 or 5, wherein the number of pulses of said drive control signal for each period of said reference signal can be changed corresponding to a control frequency of said standard signal so that a product of said number of pulses and said control frequency is not larger than a responding frequency of said electromagnetic switching means.

* * * * *